(12) United States Patent
Yoshida

(10) Patent No.: US 7,018,167 B2
(45) Date of Patent: Mar. 28, 2006

(54) FLUID MACHINERY

(75) Inventor: Minoru Yoshida, Tokyo (JP)

(73) Assignee: Y & Y Co., Ltd., Okayama (JP)

( * ) Notice: Subject to any disclaimer, the term of this patent is extended or adjusted under 35 U.S.C. 154(b) by 81 days.

(21) Appl. No.: 10/466,821

(22) PCT Filed: Jan. 26, 2001

(86) PCT No.: PCT/JP01/00517

§ 371 (c)(1),
(2), (4) Date: Jul. 22, 2003

(87) PCT Pub. No.: WO02/059464

PCT Pub. Date: Aug. 1, 2002

(65) Prior Publication Data

US 2004/0067138 A1    Apr. 8, 2004

(51) Int. Cl.
*F04D 29/38* (2006.01)

(52) U.S. Cl. ............... 415/4.5; 416/227 R; 416/227 A; 416/238

(58) Field of Classification Search ................ 415/3.1, 415/4.3, 4.5, 119, 906, 908, 914; 416/10–11, 416/197 A, 200 R, 227 R, 227 A, 223 R, 416/238, 500
See application file for complete search history.

(56) References Cited

U.S. PATENT DOCUMENTS

| | | | | |
|---|---|---|---|---|
| 680,671 | A | * | 8/1901 | Brewster ................ 416/227 R |
| 1,868,113 | A | * | 7/1932 | Ljungstrom ............ 416/227 A |
| 2,273,756 | A | * | 2/1942 | Honerkamp ............ 416/227 R |
| 4,075,500 | A | * | 2/1978 | Oman et al. ................ 415/4.3 |

(Continued)

FOREIGN PATENT DOCUMENTS

DK          85590  A  *  5/1958  ................ 415/4.3

(Continued)

OTHER PUBLICATIONS

Microfilm of the specification and drawings annexed to the request of Japanese Utility Model Application No. 9649/1979 (Laid-open No. 110786/1980), laid open on Aug. 4, 1980.

(Continued)

*Primary Examiner*—Christopher Verdier
(74) *Attorney, Agent, or Firm*—Michael Tobias

(57) ABSTRACT

An object is to improve the durability of wings and suppress vibration of the wings and generation of noise. A fluid machine includes a rotatably supported wing support, and a plurality of wings (21) formed on the wing support at a plurality of circumferential locations and protruding radially outward. The wings (21) each include a first wing element extending radially outward from a first attachment position on the wing support, a second wing element extending radially outward from a second attachment position on the wing support, and a third wing element connecting the first and second wing elements. In this case, the first and second wing elements are formed in such a manner to protrude radially outward from the wing support, and are mutually connected by means of the third wing element. This structure prevents damage to the wings (21), which damage would otherwise occur, for example, upon reception of external force, and thus improves the durability of the wings (21). Further, since stresses imposed on the third wing element can be reduced, deflection of the wing (21) caused by variation in loads imposed on the first and second wing elements can be reduced.

17 Claims, 15 Drawing Sheets

U.S. PATENT DOCUMENTS

| | | | | |
|---|---|---|---|---|
| 4,329,115 A | * | 5/1982 | Kress | 416/11 |
| 4,445,817 A | * | 5/1984 | Wethern | 416/227 R |
| 4,720,640 A | * | 1/1988 | Anderson et al. | 415/4.3 |
| 5,139,391 A | * | 8/1992 | Carrouset | 415/74 |
| 5,890,875 A | * | 4/1999 | Silvano | 416/227 R |
| 6,053,700 A | | 4/2000 | Fosdick | |

FOREIGN PATENT DOCUMENTS

| | | | | | |
|---|---|---|---|---|---|
| EP | 0334737 | | 9/1989 | | |
| FR | 808801 A | * | 2/1937 | | 416/227 A |
| FR | 2609506 A | * | 7/1988 | | 416/227 A |
| JP | 9-535 | | 7/1934 | | |
| JP | 60-212696 | | 10/1985 | | |
| JP | 2001-73923 | | 3/2001 | | |
| SE | 44040 A | * | 4/1917 | | 416/227 A |

OTHER PUBLICATIONS

Microfilm of the specification and drawings annexed to the request of Japanese Utility Model Application No. 188514/1986 (Laid-open No. 93477/1988), laid open on Jun. 16, 1988.

* cited by examiner

US 7,018,167 B2

FLUID MACHINERY

TECHNICAL FIELD

The present invention relates to fluid machines.

BACKGROUND ART

A conventional fluid machine includes a rotation unit that is rotatably disposed, has a hub and a plurality of blades, and transmits energy between the rotation unit and a fluid. For example, in a blower, axial pump, propeller, cooling fan, ventilation fan, or the like, the rotation unit is rotated so as to convert mechanical energy to fluid energy, whereas in a wind turbine, steam turbine, hydro-turbine, or the like, fluid energy is converted to mechanical energy so as to rotate the rotation unit.

However, in the above-mentioned conventional fluid machine, the blades are formed to project radially outwardly from the hub, and hence the blades are easily damaged upon reception of external force and have poor durability.

In addition, as the rotation unit rotates, vortexes are generated at the tips of the blades, and such tip vortexes cause vibration of the blades and generation of noise.

An object of the present invention is to solve the above-mentioned problems involved in the conventional fluid machines and to provide a fluid machine which can improve the durability of wings and suppress vibration of the wings and generation of noise.

DISCLOSURE OF THE INVENTION

To achieve the above object, a fluid machine of the present invention comprises a rotatably supported wing support; and a plurality of wings formed on the wing support at a plurality of circumferential locations and protruding radially outward.

The wings each include a first wing element extending radially outward from a first attachment position on the wing support, a second wing element extending radially outward from a second attachment position on the wing support, and a third wing element connecting the first and second wing elements.

In this case, the first and second wing elements are formed in such a manner to protrude radially outward from the wing support, and are mutually connected by means of the third wing element. This structure prevents damage to the wings, which damage would otherwise occur, for example, upon reception of external force, and thus improves the durability of the wings. Further, stresses imposed on the third wing element can be reduced, and even if the loads imposed on the first and second wing elements change, the wing deflects only to a small extent. Moreover, when the loads imposed on the first and second wing elements are light, centrifugal force generated on the third wing element reduces the bending moments generated at the roots of the first and second wings elements.

Therefore, pulsation, reaction force, etc., generated upon rotation of the wing support and the wings do not act on the wings, and thus, generation of vibrations in the wings can be suppressed. Further, the durability of the wings can be enhanced, and the wings can be thinned to a degree corresponding to the degree of reduction of deformation generated in the wings, whereby the support and the wings can be reduced in weight. Accordingly, drive means or the like connected to the wing support and the wings can be reduced in size.

By virtue of formation of the third wing element, the pressure on the surface of each wing changes continuously from positive pressure on the second wing element to negative pressure on the first wing element, whereby generation of tip vortexes at the tips of the wings can be suppressed. Therefore, vibrations of the wings and generation of noise stemming from tip vortexes can be suppressed.

In another fluid machine of the present invention, the third wing element extends at a constant distance from the wing support to thereby form a flat portion.

In still another fluid machine of the present invention, the second wing element is located forward in a rotational direction of the wing support in relation to the first wing element.

In still another fluid machine of the present invention, a rotation unit comprises a wing support and wings, and is rotated through drive of an electrical device.

In still another fluid machine of the present invention, a rotation unit comprises a wing support and wings, and is rotated through drive of drive means.

In still another fluid machine of the present invention, the rotation unit is surrounded by a duct.

In still another fluid machine of the present invention, a rotation unit comprises a wing support and wings, and is rotated by means of a fluid so as to drive an electrical device.

BEST MODE FOR CARRYING OUT THE INVENTION

Embodiments of the present invention will now be described in detail with reference to the drawings.

Figure 1:
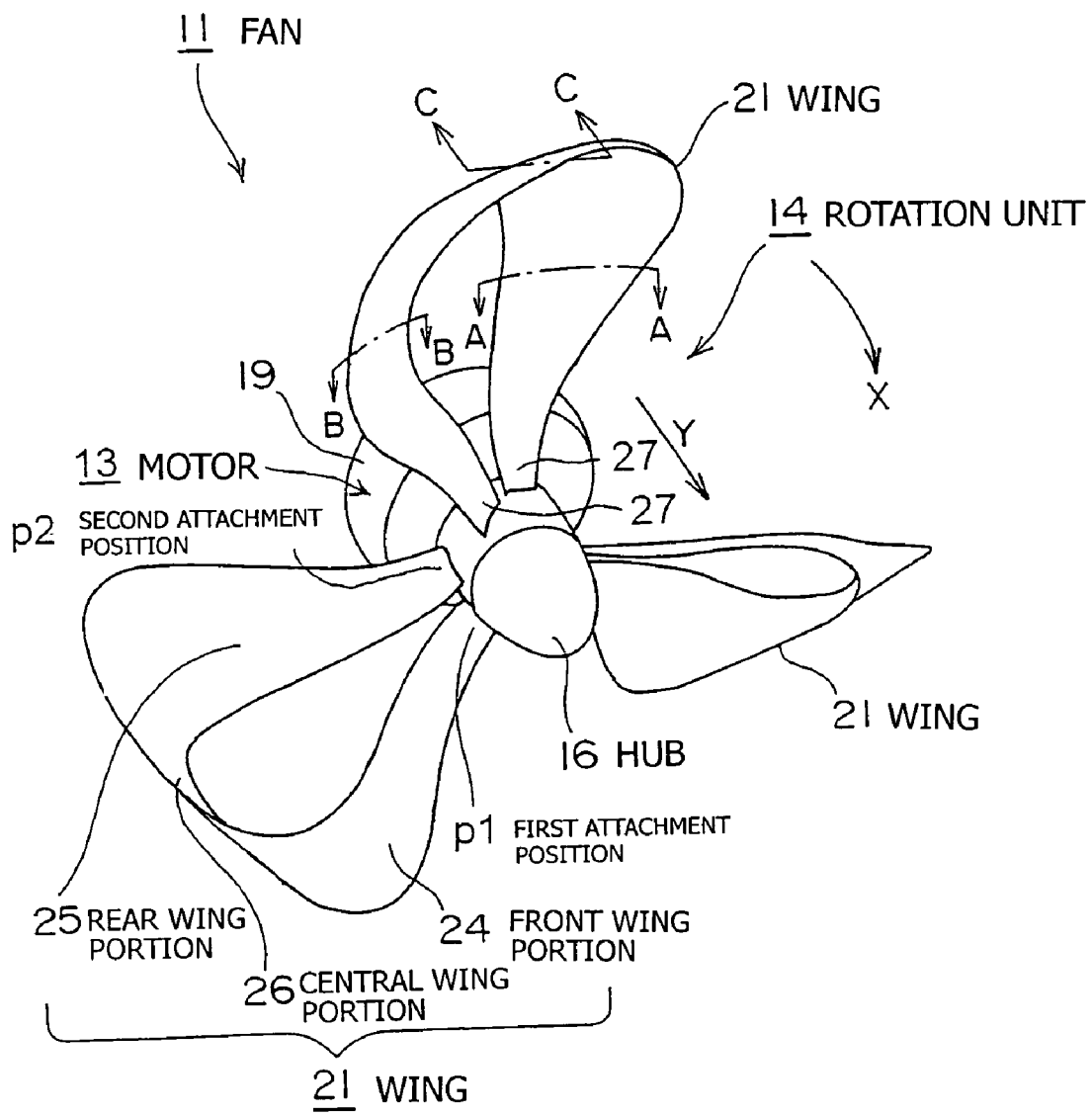
FIG. 1 is a perspective view of a fan according to a first embodiment of the present invention.
Figure 2:
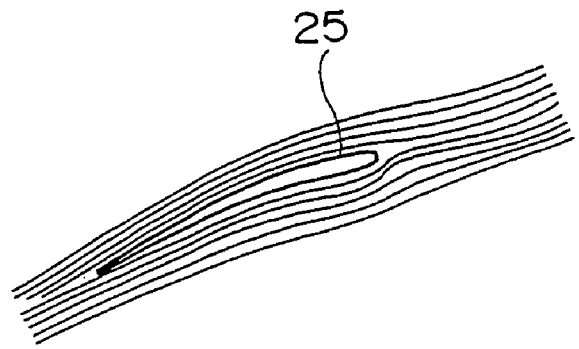
FIG. 2 is a sectional view taken along line A—A in FIG. 1.
Figure 3:
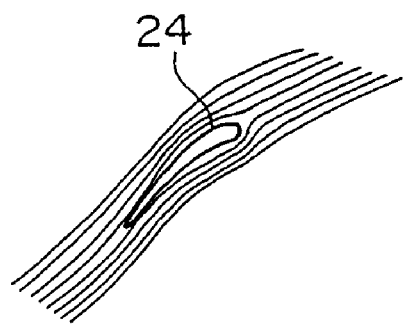
FIG. 3 is a sectional view taken along line B—B in FIG. 1.
Figure 4:
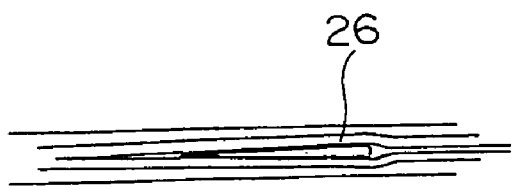
FIG. 4 is a sectional view taken along line C—C in FIG. 1.

FIG. 1 is a perspective view of a fan according to a first embodiment of the present invention; FIG. 2 is a sectional view taken along line A—A in FIG. 1; FIG. 3 is a sectional view taken along line B—B in FIG. 1; and FIG. 4 is a sectional view taken along line C—C in FIG. 1.

In FIGS. 1, 2, 3 and 4, reference numeral 11 denotes a fan (a fluid machine); 13 denotes an electric motor (serving as an electrical device and drive means) mounted to an unillustrated support portion; and 14 denotes a rotation unit which is disposed to rotate freely with respect to the electric motor 13. The electric motor 13 consists of a case 19, an unillustrated rotor disposed to be rotatable with respect to the case 19, and an unillustrated stator attached to the case and surrounding the rotor. The rotation unit 14 includes a hub (serving as a wing support) 16, and a plurality of (three in the present embodiment) wings 21. In the present embodiment, the wing support comprises a single hub 16. However, the wing support may comprise two hubs and a shaft for connecting the hubs. Further, in the present embodiment, the electric motor 13 is used as the drive means. However, an internal combustion engine, a hydraulic machine, or a pneumatic machine may be used instead of the electric motor 13.

The wings 21 are formed on the hub 16 at a plurality of locations (in the present embodiment, three locations) along the circumferential direction in such a manner that the wings 21 project radially outward at equal angular intervals. Each of the wings 21 assumes a loop shape, and includes a front wing portion 24 serving as a first wing element, a rear wing portion 25 serving as a second wing element, and a central wing portion 26 serving as a third wing element. The front wing portion 24 extends radially outward from a front-side, first attachment position p1 on the hub 16, and inclines frontward. The rear wing portion 25 extends radially outward from a rear-side, second attachment position p2 on the hub 16, and inclines rearward. The central wing portion 26 connects the front wing portion 24 and the rear wing portion 25 at their largest radius points, and extends at a constant distance from the hub 16 to thereby form a flat portion.

Next, the wings 21 will be described.

Figure 5:
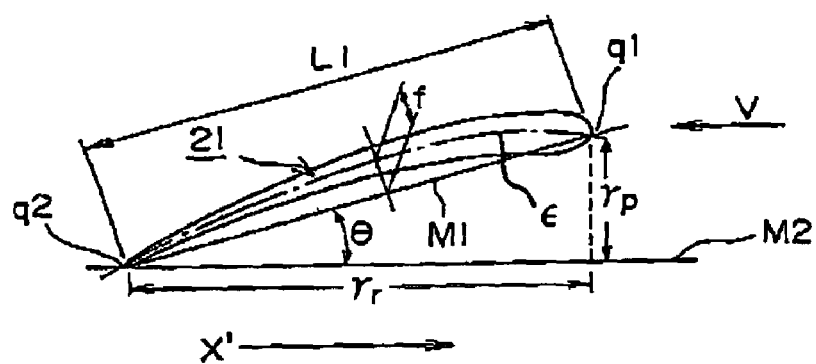
FIG. 5 is a sectional view of a wing used in the first embodiment of the present invention.
Figure 6:
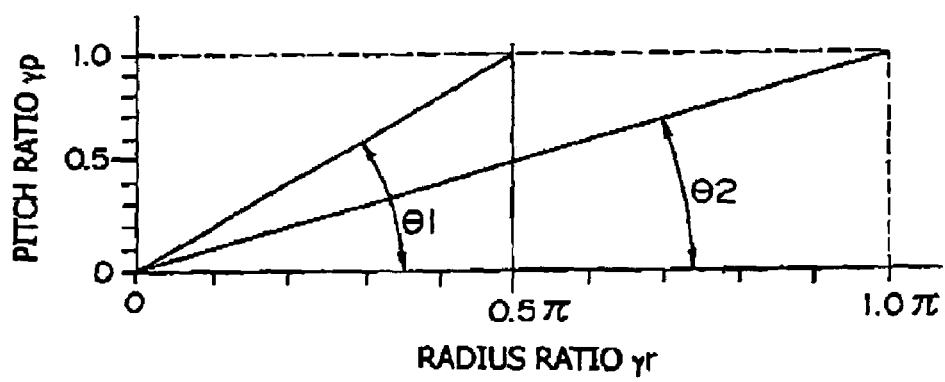
FIG. 6 is a view used for explaining a pitch angle in the first embodiment of the present invention.
Figure 7:
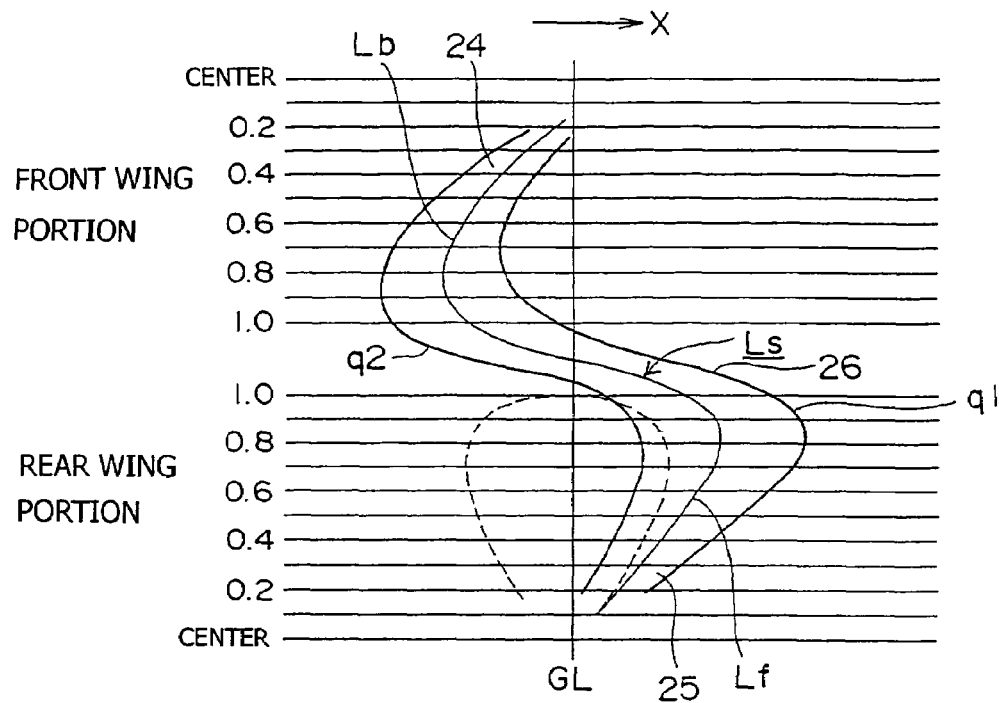
FIG. 7 is a development of a wing used in the first embodiment of the present invention.
Figure 8:
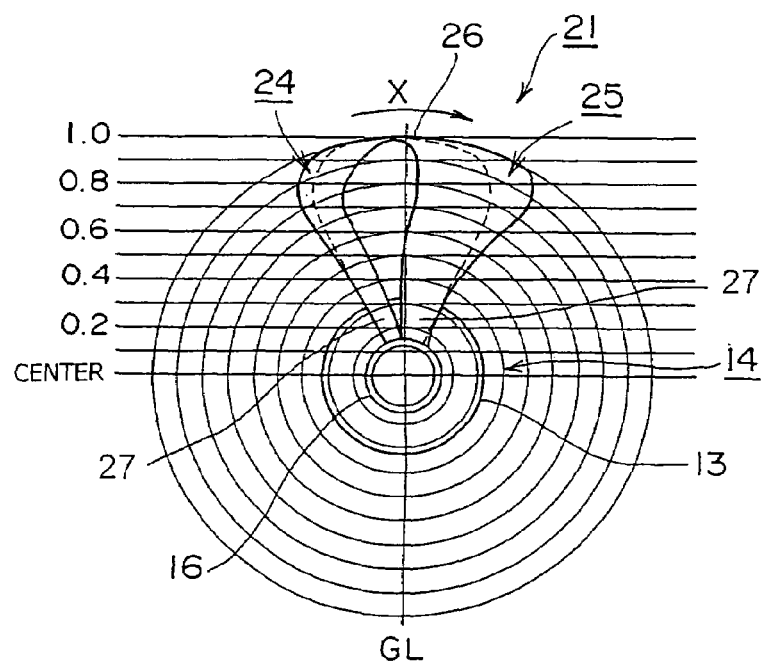
FIG. 8 is a front view showing a manner of attachment of the wing employed in the first embodiment of the present invention.
Figure 9:
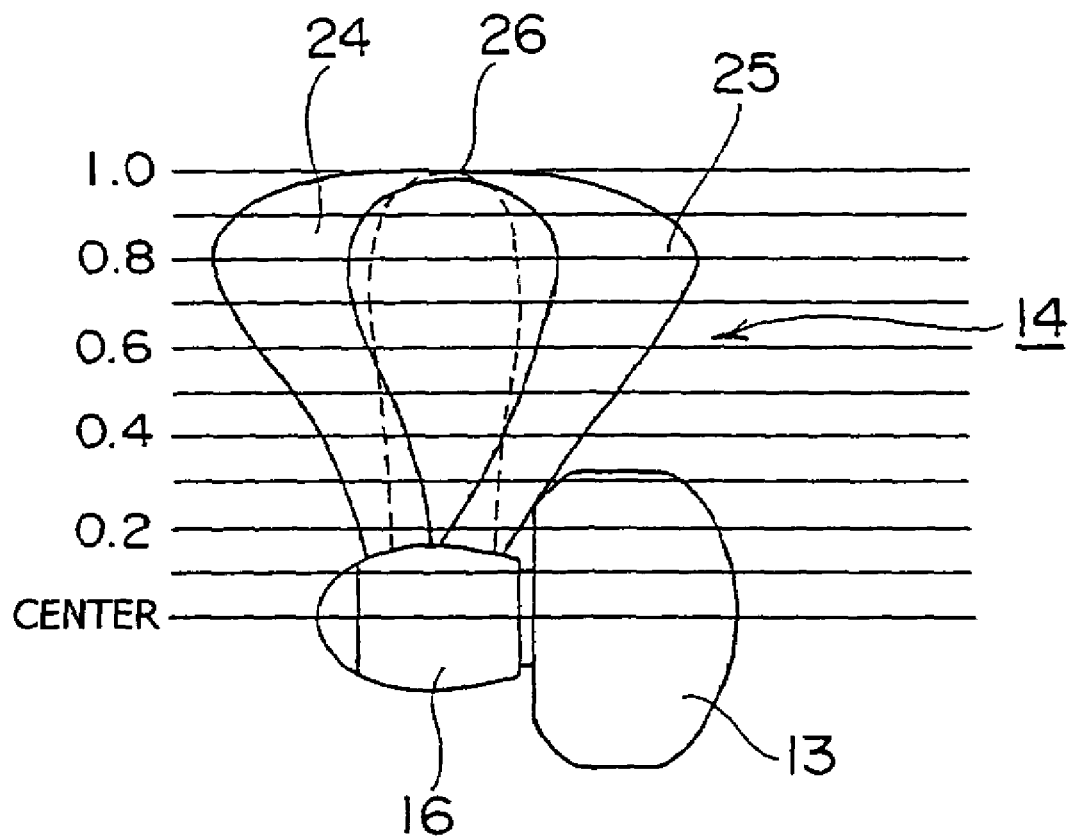
FIG. 9 is a side view showing the manner of attachment of the wing employed in the first embodiment of the present invention.
Figure 10:
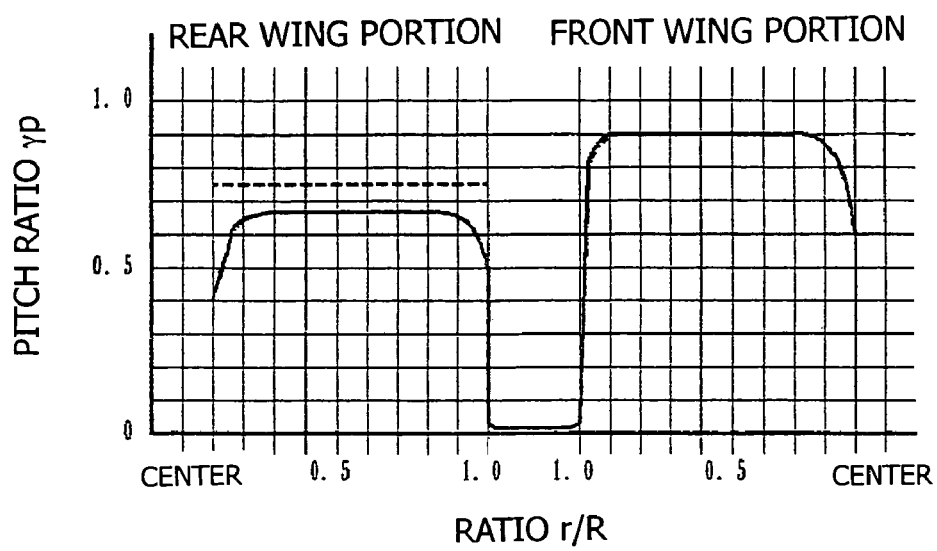
FIG. 10 is a graph showing a pitch profile of a constant pitch wing used in the first embodiment of the present invention.
Figure 11:
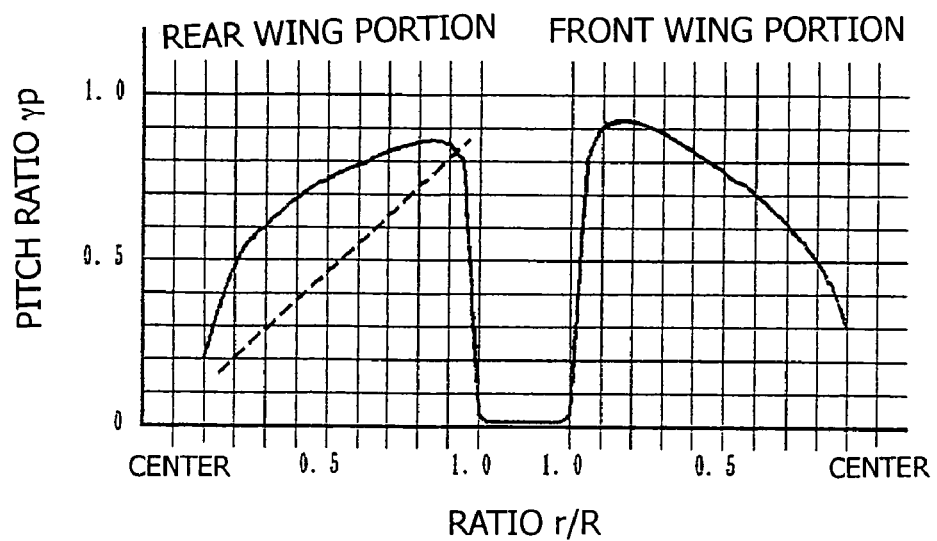
FIG. 11 is a graph showing a pitch profile of a gradually-increasing-pitch wing used in the first embodiment of the present invention.
Figure 12:
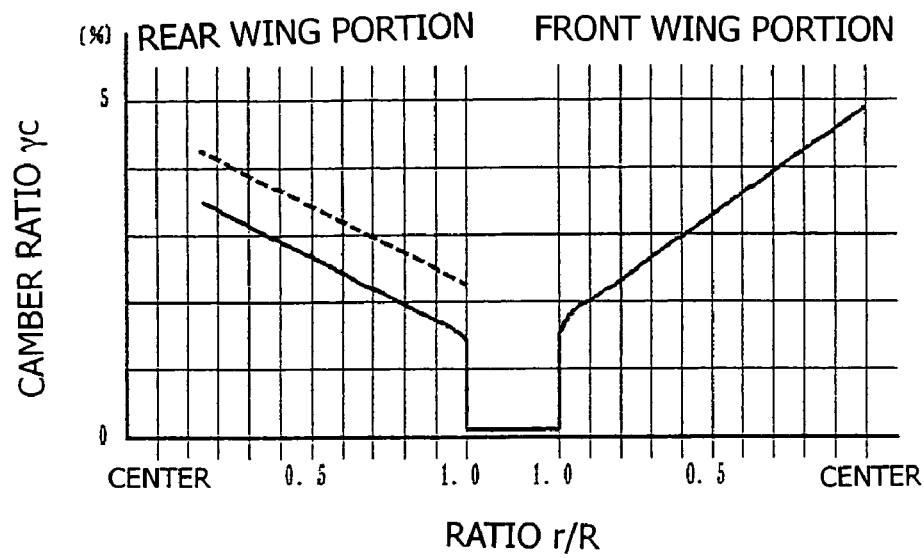
FIG. 12 is a graph showing a camber profile in the first embodiment of the present invention.
Figure 13:
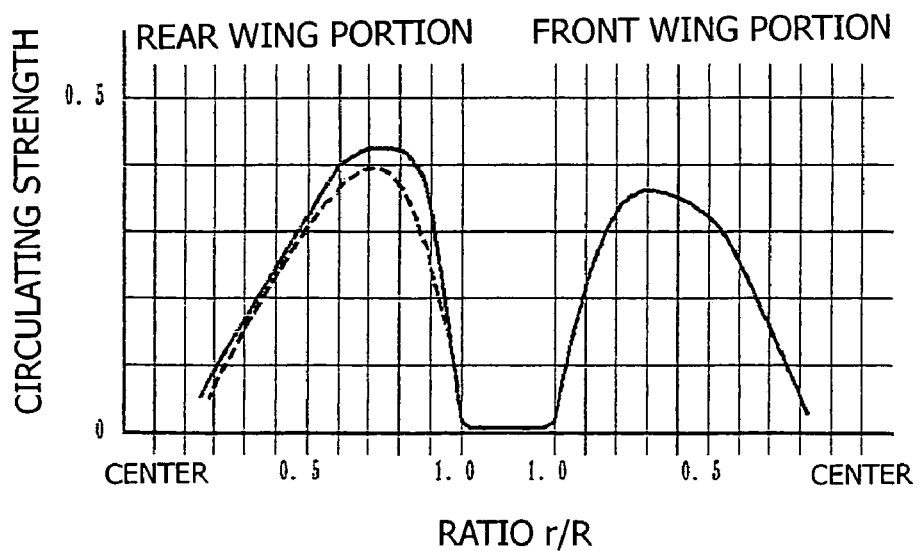
FIG. 13 is a graph showing a circulating strength profile in the first embodiment of the present invention.

FIG. 5 is a sectional view of a wing used in the first embodiment of the present invention; FIG. 6 is a view used for explaining a pitch angle in the first embodiment of the present invention; FIG. 7 is a development of a wing used in the first embodiment of the present invention; FIG. 8 is a front view showing a manner of attachment of the wing employed in the first embodiment of the present invention; FIG. 9 is a side view showing the manner of attachment of the wing employed in the first embodiment of the present invention; FIG. 10 is a graph showing a pitch profile of a constant pitch wing used in the first embodiment of the present invention; FIG. 11 is a graph showing a pitch profile of a gradually-increasing-pitch wing used in the first embodiment of the present invention; FIG. 12 is a graph showing a camber profile in the first embodiment of the present invention; and FIG. 13 is a graph showing a circulating strength profile in the first embodiment of the present invention. In FIG. 6, the horizontal axis represents radius ratio γr, and the vertical axis represents pitch ratio γp. In each of FIGS. 10 and 11, the horizontal axis represents ratio r/R, and the vertical axis represents pitch ratio γp. In FIG. 12, the horizontal axis represents ratio r/R, and the vertical axis represents camber ratio γc. In FIG. 13, the horizontal axis represents ratio r/R, and the vertical axis represents circulating strength. In FIG. 7 through FIG. 13, continuous lines show the characteristics of the fan according to the present invention, and broken lines show the characteristics of a conventional fan.

In FIG. 5, reference numeral 21 denotes a wing. When the rotation unit 14 (FIG. 1) is rotated in the direction of arrow X', air serving as a fluid flows toward the wing 21 along the direction of arrow V. ε represents a center line (in the thickness direction) of the wing 21. q1 represents the leading edge of the wing 21. q2 represents the trailing edge of the wing 21. M1 represents a line connecting the leading edge q1 and the trailing edge q2. M2 represents a line which extends toward the direction of movement of the wing 21 (the direction of arrow X'). L1 represents the length of a straight line (or chord length) between the leading edge q1 and the trailing edge q2. γr represents the length of a straight line (which represents radius ratio) between the leading edge q1 and the trailing edge q2 along the rotating direction of the rotation unit 14, when the wing 21 is cut at a certain radial position, or a certain position in the radial direction of the rotation unit 14. γp represents the length of a straight line (which represents pitch ratio) between the leading edge q1 and the trailing edge q2 along the axial direction of the rotation unit 14, when the wing 21 is cut at the certain radial position in the radial direction of the rotation unit 14. θ represents the angle (which represents pitch angle) formed by and between the line Mi and the line M2. f represents the camber or the longest distance between the wing center line (in the thickness direction) e and the line M1. Notably, camber ratio γc, which represents the ratio of camber f to the wing chord length L1, is:

$\gamma = f/L1$.

The aforementioned wing chord length L1, pitch ratio γp, radius ratio γr, pitch angle θ, and camber f are set for each radial position of the rotation unit 14.

Incidentally, the aforementioned pitch ratio γp and radius ratio γr are set according to the size of the rotation unit 14. When the diameter of the rotation unit 14 is represented by D, the radius of the rotation unit 14 is represented by R, the distance from the center to an arbitrary radial position as measured along the radial direction of the rotation unit 14 is represented by r, and pitch is represented by H, the aforementioned radius ratio γr is:

$$\gamma r = \pi r/R,$$

and the aforementioned pitch ratio γp is:

$$\gamma p = H/D.$$

Therefore, pitch angle θ at a certain radial position is:

$$\theta = \tan^{-1}(\gamma p/\gamma r)$$
$$= \tan^{-1}\{(H/D)/(\pi r/R)\}.$$

In the present embodiment, the wings 21 are of a constant pitch type; i.e., the pitch ratio γp is maintained constant along the radial direction of the rotation unit 14. The aforementioned radius ratio γr becomes smaller as the radial distance r becomes shorter, and becomes larger as the radial distance r becomes longer. Therefore, the pitch angle θ varies along the radial direction of the wing 21 in such a manner that as the radial distance r becomes shorter, or the radius ratio γr becomes smaller, the pitch angle θ becomes larger, and as the radial distance r becomes longer, or the radius ratio γr becomes larger, the pitch angle θ becomes smaller. As shown in FIG. 6, the pitch angle θ1 at the radius ratio γr of 0.5π is larger than the pitch angle θ2 at the radius ratio γr of 1.0π.

Incidentally, as shown in FIGS. 7 and 8, in the rotating direction of the rotation unit 14 (the direction of arrow X), the front wing portion 24 is positioned upstream of a reference line GL of the wing 21, and the rear wing portion 25 is positioned downstream of the reference line GL. Wing thickness, wing width profile, etc. are shown in development, while the aforementioned reference line GL is used as a reference. As the distance from the center of the rotation unit 14 increases; i.e., as the ratio of the radial distance r to the radius R (or r/R) increases, the front wing portion 24 and the rear wing portion 25 move away from the reference line GL toward the rotating direction, and the wing chord length L1 increases. The front wing portion 24 and the rear wing portion 25 are joined via the central wing portion 26 at a radial position near a radial position where the distance from the reference line GL becomes the greatest and the chord length L1 becomes the longest (normally, a radial position at which the aforementioned ratio r/R assumes a value of 0.7 to 0.9); i.e., at a portion of the rotation unit 14 where the rotation unit 14 assumes the maximum radius. Notably, the position where the chord length L1 becomes the longest is appropriately set in accordance with the shape of the wing 21.

In FIG. 7, Ls represents the skew line (the widthwise center line of the wing), Lf represents the forward skew that is set downstream of the reference line GL, and Lb represents the backward skew that is set upstream of the reference line GL.

The forward skew Lf realizes the same effect as the swept-back wing of an aircraft; that is, an operation for transferring lift generated by the rear wing portion 25 to the tip end of the rear wing portion 25, to thereby improve the efficiency in blowing air. The backward skew Lb transfers lift generated by the front wing portion 24 to the root of the front wing portion 24 so as to prevent generation of tip vortex at the back edge q2 of the tip end of the front wing portion 24.

As shown in, for example, FIG. 9, as the distance from the center of the rotation unit 14 increases, the position of the front wing portion 24 moves forward, and the position of the rear wing portion 25 moves backward. At a radial position near the radial position where the front wing portion 24 reaches the foremost position and the rear wing portion 25 reaches the rearmost position, the front wing portion 24 and the rear wing portion 25 are connected with each other via the central wing portion 26. Notably, the shapes of the front wing portion 24 and the rear wing portion 25 can be set as desired.

As shown in, for example, FIG. 10, the pitch ratio γp at the rear wing portion 25 is set smaller than the pitch ratio γp at the front wing portion 24. FIG. 10 shows variation in the pitch ratio γp for the case in which the wing 21 is of a constant pitch type in which the pitch ratio γp is maintained constant along the radial direction of the rotation unit 14. However, the wing 21 may be of a gradually-increasing-pitch type in which the pitch ratio γp increases with the distance from the center of the rotation unit 14 as shown in FIG. 11.

Further, as shown in, for example, FIG. 12, for a given radial distance r the camber ratio γc at the rear wing portion 25 is set to be smaller than the camber ratio γc at the front wing portion 24; and the camber ratio γc at the central wing portion 26 is set to approximately 0.

As explained above, the wing 21 can have two characteristics, which are respectively provided by the front wing portion 24 and the rear wing portion 25. Therefore, the front wing portion 24 and the rear wing portion 25 can be designed to have different characteristics in accordance with an intended purpose of the wing 21. For example, depending on the arrangement of the front wing portion 24 and the rear wing portion 25, a flap effect (an effect in which the front wing portion 24 and the rear wing portion 25 affect each other) can be expected.

From the pitch profile shown in FIG. 10 and the camber profile shown in FIG. 12, a circulating strength profile as shown in FIG. 13 can be obtained. The circulating strength profile represents a pressure profile, which represents the performance (such as lift) of the wing 21 at each radial location. An integral value of pressure taken along the radial direction represents the performance of the entire wing 21. In circulation theory, a simple model, a 3D model, a vortex factor-added model, and other models are used.

The fan 11 having the above-described structure operates as follows. When the rotation unit 14 is rotated in the direction of arrow X through drive of the motor 13, mechanical energy is converted to fluid energy by the wings 21, and air (fluid) is caused to flow towards the direction of arrow Y. In this case, since the front wing portion 24 is located upstream of the rear wing portion 25 with respect to the rotating direction of the rotation unit 14, when the rotation unit 14 is driven, the rear wing portion 25 precedes the front wing portion 24. Therefore, the wind generated by the rear wing portion 25 can be accelerated by the front wing portion 24.

Because the front wing portion 24 and the rear wing portion 25 project radially outward from the hub 16, and are mutually connected at their tip ends via the central wing portion 26, stresses that act on the roots 27 of the front wing portion 24 and the rear wing portion 25 upon reception of an external force can be reduced. Therefore, breakage of the wing 21 can be prevented, and durability of the wing 21 can be improved. Also, the stresses acting on the roots 27 can be reduced, and even if the loads imposed on the front wing portion 24 and the rear wing portion 25 change, the wing 21 deflects only to a small extent. Further, when the loads imposed on the front wing portion 24 and the rear wing portion 25 are small, centrifugal force generated at the central wing portion 26 reduces bending moments generated at the roots of the front wing portion 24 and the rear wing portion 25.

Therefore, pulsation, reaction force, or a like force does not act on the wing 21 during rotation of the rotation unit 14, and thus generation of vibration in the wing 21 can be prevented. Further, the durability of the wing 21 is improved, and the wings 21 can be thinned to a degree corresponding to the degree of reduction of deformation generated in the wings 21, whereby the weight of the rotation unit 14 can be reduced. Accordingly, the size of the motor 13 can be reduced.

Since the central wing portion 26 is formed, and thus, the pressure on the surface of the wing 21 changes continuously from positive pressure on the rear wing portion 25 to negative pressure on the front wing portion 24, generation of tip vortex at the tip end of the wing 21 can be suppressed. Therefore, vibration of the wing 21 and generation of noise by tip vortex can be suppressed. For example, the noise level can be reduced by 10 dB or more; and the sound intensity can be reduced to one-seventh or less.

Next, a second embodiment of the present invention will be described. Components having the same configurations as those of the first embodiment are denoted by the same reference numerals, and their repeated descriptions are omitted.

Figure 14:
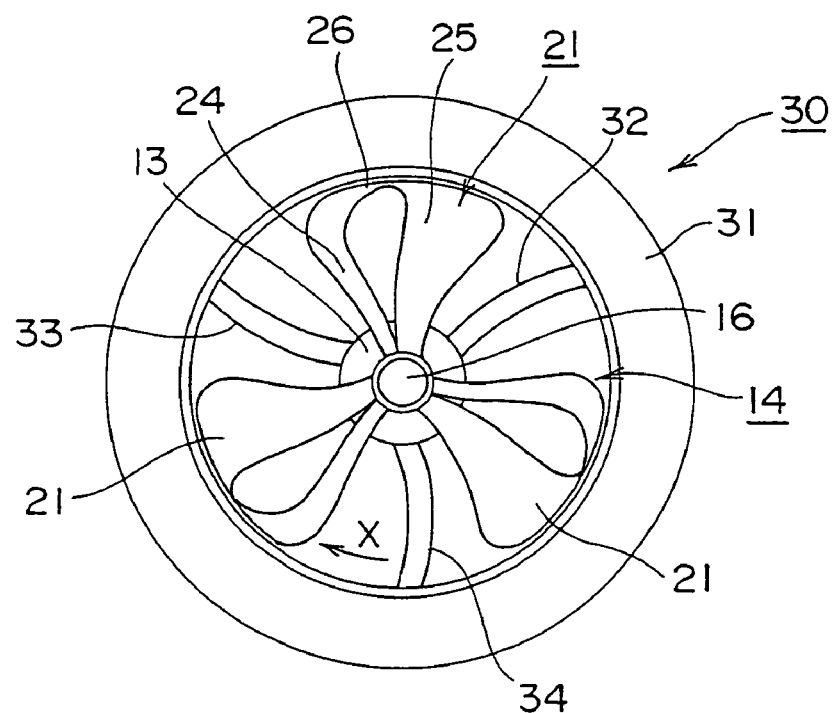
FIG. 14 is a front view of a duct-type fan according to a second embodiment of the present invention.
Figure 15:
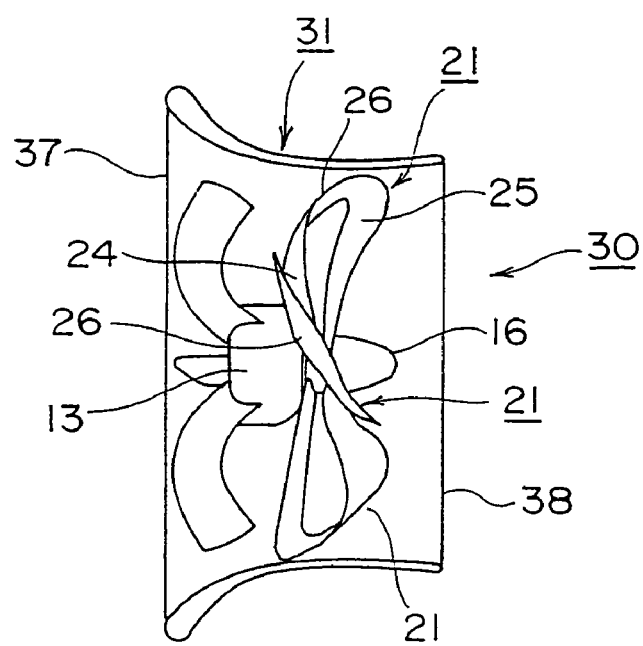
FIG. 15 is a first sectional view of the duct-type fan according to the second embodiment of the present invention.
Figure 16:
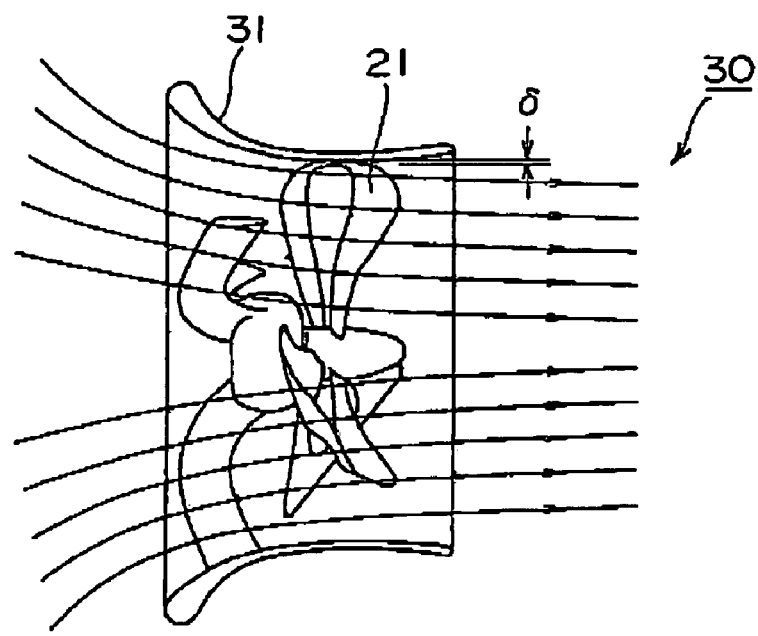
FIG. 16 is a second sectional view of the duct-type fan according to the second embodiment of the present invention.
Figure 17:
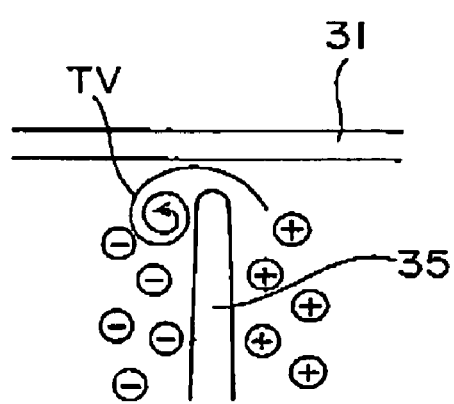
FIG. 17 is a reference drawing showing characteristics of a conventional duct-type fan.
Figure 18:
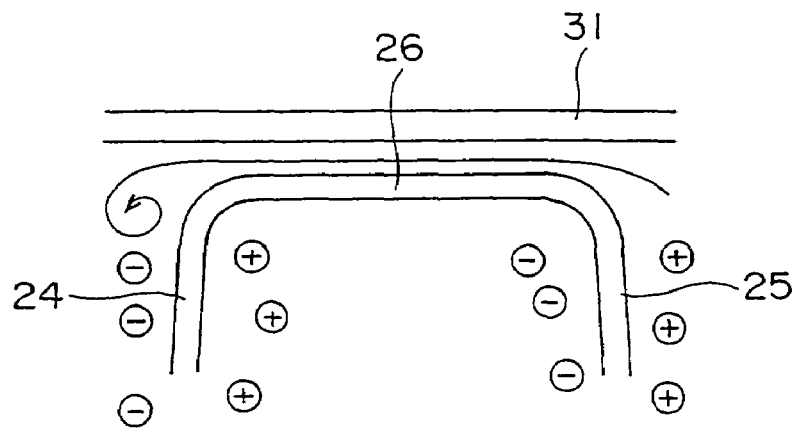
FIG. 18 is a drawing showing characteristics of the duct-type fan according to the second embodiment of the present invention.

FIG. 14 is a front view of a duct-type fan according to the second embodiment of the present invention; FIG. 15 is a first sectional view of the duct-type fan according to the second embodiment of the present invention; FIG. 16 is a second sectional view of the duct-type fan according to the second embodiment of the present invention; FIG. 17 is a reference drawing showing characteristics of a conventional duct-type fan; and FIG. 18 is a drawing showing characteristics of the duct-type fan according to the second embodiment of the present invention.

In these drawings, reference numeral 30 denotes a duct-type fan serving as a fluid machine. The fan 30 includes a cylindrical duct 31; a motor (serving as an electrical device and drive means) 13 attached to the duct 31 via connection members 32 to 34; and a rotation unit 14 disposed to be freely rotatable relative to the motor 13 and surrounded by the duct 31. The duct 31 has an inlet port 37 at its rear end (the left end in FIG. 15) in order to induct air serving as a fluid, and an outlet port 38 at its front end (the right end in FIG. 15) in order to discharge air. The inner diameter of the duct 31 gradually decreases from the inlet 37 towards the outlet 38 up to the center portion.

In the case of a conventional duct-type fan, as shown in FIG. 17, the border between a region where positive pressure (shown with + in FIG. 17) is imposed on the surface of a wing 35 and a region where negative pressure (shown with − in FIG. 17) is imposed on the surface of the wing 35 assumes the form of a line, so that the pressure circulation at the tip end of the wing 35 is large, and a tip vortex TV is generated. By contrast, in the case of the duct-type fan 30 according to the present embodiment, as shown in FIG. 18, the border between a region where positive pressure (+) is imposed on the surface of the rear wing portion 25 and a region where negative pressure (−) is imposed on the surface of the front wing portion 24 assumes the form of a flat surface, so that the pressure circulation at the tip end of the wing 21 decreases, and generation of tip vortex TV is suppressed. Therefore, the tip clearance δ between the inner circumferential surface of the duct 31 and the outer circumferential surface of the central wing portion 26 can be reduced, whereby the pressure performance of the fan 30 can be improved, and generation of vibration and noise is suppressed.

Next, a third embodiment of the present invention will be described.

Figure 19:
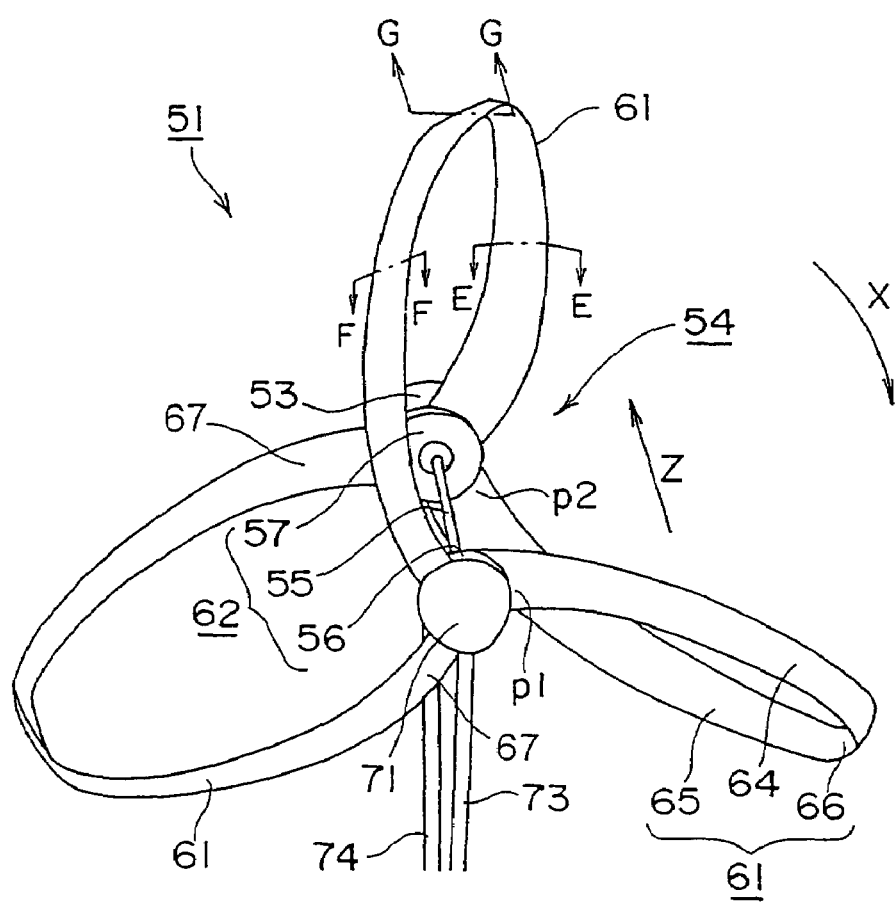
FIG. 19 is a perspective view of a wind turbine according to a third embodiment of the present invention.
Figure 20:
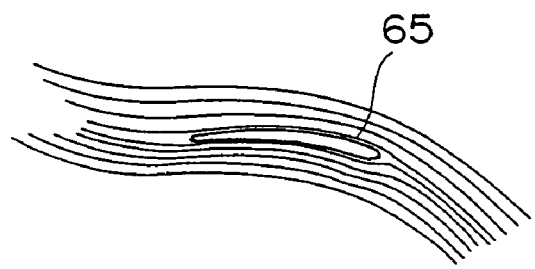
FIG. 20 is a sectional view taken along line E—E in FIG. 19.
Figure 21:
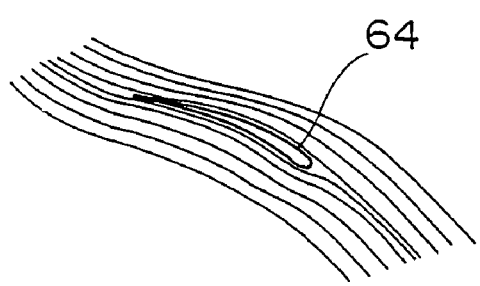
FIG. 21 is a sectional view taken along line F—F in FIG. 19.
Figure 22:
FIG. 22 is a sectional view taken along line G—G in FIG. 19.

FIG. 19 is a perspective view of a wind turbine according to the third embodiment of the present invention; FIG. 20 is a sectional view taken along line E—E in FIG. 19; FIG. 21 is a sectional view taken along line F—F in FIG. 19; and FIG. 22 is a sectional view taken along line G—G in FIG. 19.

In FIGS. 19 to 22, reference numeral 51 denotes a wind turbine serving as a fluid machine; 53 denotes a generator serving as an electrical device; 54 denotes a rotation unit disposed to be rotatable relative to the generator 53; 71 denotes a bearing: 73 denotes a front stay; and 74 denotes a rear stay. An unillustrated bearing is formed on the upper end of the rear stay 74. The rotation unit 54 is rotatably supported by the bearing 71 and the bearing at the top end of the rear stay 74. Further, an unillustrated nacelle is disposed at the lower ends of the front stay 73 and the rear stay 74. The nacelle is rotatably supported on an unillustrated support column, which serves as a support portion. The generator 53 consists of a case, an unillustrated rotor disposed to be rotatable with respect to the case, and an unillustrated stator attached to the case and surrounding the rotor. The rotation unit 54 includes a shaft 55 attached to the rotor; a front hub 56 fixed to the front end of the shaft 55; a rear hub 57 fixed to the shaft 55 to be separated from the front hub 56 by a predetermined distance and be located adjacent to the generator 53; and a plurality of (three in the present embodiment) wings 61 disposed to extend between the front hub 56 and the rear hub 57. Notably, a wing support 62 comprises the shaft 55, the front hub 56, and the rear hub 57. In the present embodiment, the wing support 62 comprises the shaft 55, the front hub 56, and the rear hub 57. However, the wing support 62 may comprise a single hub. When the outer diameter of the rotation unit 54 is represented by DR, and the axial dimension (length) of the rotation unit 54 is represented by DL, $$DR \geq 1.3 \times DL.$$

The wings 61 are formed on the wing support 62 at a plurality of locations (in the present embodiment, three locations) along the circumferential direction in such a manner that the wings 61 project radially outward at equal angular intervals. Each of the wings 61 assumes a loop shape, and includes a front wing portion 64 serving as a first wing element, a rear wing portion 65 serving as a second wing element, and a central wing portion 66 serving as a third wing element. The front wing portion 64 extends radially outward from a first attachment position p1 on the front hub 56, and inclines rearward. The rear wing portion 65 extends radially outward from a second attachment position p2 on the rear hub 57, and inclines frontward. The central wing portion 66 connects the front wing portion 64 and the rear wing portion 65 at their points of largest radius, and extends at a constant distance from the wing support 62 to thereby form a generally flat portion.

Next, the wings 61 will be described.

Figure 23:
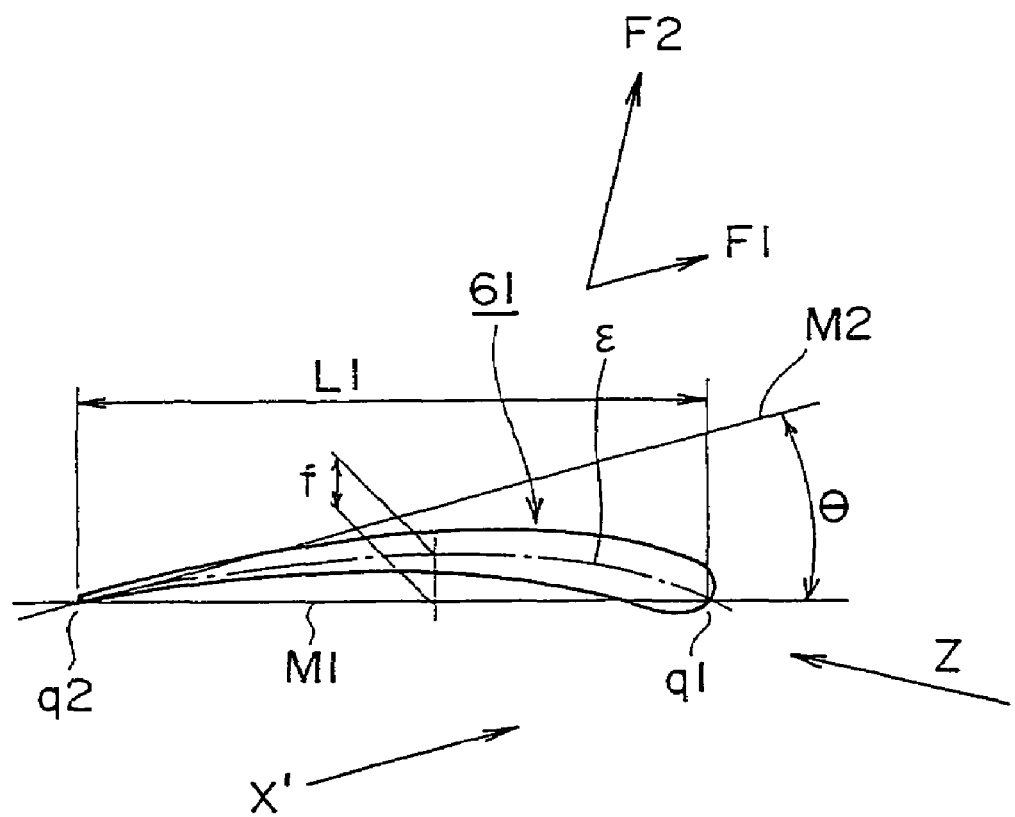
FIG. 23 is a sectional view of a wing used in the third embodiment of the present invention.

FIG. 23 is a sectional view of a wing used in the third embodiment of the present invention.

In FIG. 23, when air serving as a fluid flows toward the wing 61 along the direction of arrow Z, rotation force F1 and lift F2 are generated, whereby the wing 61 is moved in the direction of arrow X', and the rotation unit 54 is rotated in the direction of arrow X. $\epsilon$ represents a center line (in the thickness direction) of the wing 61. q1 represents the leading edge of the wing 61. q2 represents the trailing edge of the wing 61. M1 represents a line connecting the leading edge q1 and the trailing edge q2. M2 represents a line which extends toward the direction of movement of the wing 61 (the direction of arrow X'). L1 represents the length of a straight line (or chord length) between the leading edge q1 and the trailing edge q2. $\theta$ represents the angle (which represents pitch angle) formed by and between the line M1 and the line M2. f represents the camber, or the longest distance between the wing center line (in the thickness direction) $\epsilon$ and the line M1.

In the wind turbine 51 having the above-described structure, when air flows in the direction of arrow Z, fluid energy is converted to mechanical energy by the wing 61, so that the rotation unit 54 is rotated in the direction of arrow X, and the generator 53 is driven so as to generate electricity. This means that energy can be produced not only from air that enters the turbine from the front side thereof, but also from air that obliquely enters the turbine.

In this case, the front wing portion 64 is located upstream of the rear wing portion 65 with respect to the rotating direction of the rotation unit 54, and thus, when the rotation unit 54 is rotated, the rear wing portion 65 precedes the front wing portion 64 by 15° or more. Therefore, when the rotation unit 54 is rotated at low speed, the rear wing portion 65 is not affected by the front wing portion 64 with regard to an air flow coming in the direction of arrow Z. By contrast, when the rotation unit 54 is rotated at high speed, the front wing portion 64 imposes influence on an upstream portion of a subsequent wing 61; i.e., the rear wing portion 65 of the subsequent wing 61, whereby the rotation unit 54 is stalled and braked. In other words, in a low speed range, the three wings 61 substantially function as six wings, to thereby generate large torque; whereas in a high speed range, generation of large torque can be prevented without deflection of the wings 61. This means that output of the wind turbine can be restricted.

At the central wing portion 66, fluid energy of air coming from the front side is not converted to mechanical energy, and the status of tip unloaded is established. Therefore, generation of tip vortex can be prevented, and vibration of the wing 61 and generation of noise are suppressed.

Since the wing 61 assumes the shape of a loop, even when an article hits the wing 61 during rotation, the impact acting on the wing 61 can be reduced. Therefore, the wind turbine 51 does not need to be installed in an area remote from a residential area, and restriction on the installation site can be removed. The wind turbine 51 can be installed in an area which is close to an electricity demand area and where many people reside, or an area where air turbulence is caused by forests, buildings or the like. Thus, cost for distributing electricity generated by the wind turbine 51 to the demand area can be reduced. Furthermore, since, unlike conventional blades, the wing 61 does not have a knife-shaped edge portion, a higher level of safety is realized.

Because the front wing portion 64 and the rear wing portion 65 project radially outward from the front hub 56 and the rear hub 57, respectively, and are mutually connected at their tip ends via the central wing portion 66, stresses that act on the roots 67 of the front wing portion 64 and the rear wing portion 65 upon reception of an external force can be reduced. Therefore, breakage of the wing 61 can be prevented, and durability of the wing 61 can be improved. Also, since the stresses acting on the roots 67 can be reduced, even if the loads imposed on the front wing portion 64 and the rear wing portion 65 change, the wing 61 deflects only to a small extent. Further, when the loads imposed on the front wing portion 64 and the rear wing portion 65 are small, centrifugal force generated at the central wing portion 66 reduces bending moments generated at the roots 67 of the front wing portion 64 and the rear wing portion 65.

Therefore, pulsation, reaction force, or a like force does not act on the wing 61 during rotation of the rotation unit 54, thereby preventing generation of vibration in the wing 61. Further, the durability of the wing 61 is improved, and the wing 61 can be thinned to a degree corresponding to the degree of reduction of deformation generated in the wing 61, whereby the weight of the rotation unit 54 can be reduced.

Since the central wing portion 66 is formed, and thus, the pressure on the surface of the wing 61 changes continuously from positive pressure on the rear wing portion 65 to negative pressure on the front wing portion 64, generation of tip vortex at the tip end of the wing 61 can be suppressed. Therefore, vibration of the wing 61 and generation of noise by tip vortex can be suppressed. For example, the noise level can be reduced by 10 dB or more; and the sound intensity can be reduced to one-seventh or less.

Since the central wing portion 66 is flat, an operator can stop rotation of the rotation unit 54 by pressing his/her hand against the central wing portion 66, or can prevent rotation of the rotation unit 54 by engaging an unillustrated engagement member with the loop of the wing 61. Therefore, the rotation unit 54 can be maintained in a stopped state under strong wind conditions, thereby improving the level of safety.

In the present embodiment, the wind turbine 51 has been described. However, the present invention can be applied to a turbine in which preceding and succeeding wings interfere with each other so that a wake caused by the preceding wing stalls the succeeding wing, and a turbine installed in a turbulence and driven by fluid containing a large number of vortexes.

Since the front hub 56 and the rear hub 57 are mutually spaced by a predetermined distance via the shaft 55, the rotation unit 54 generally assumes a spherical shape, so that the center of gravity will not fall outside the rotation unit 54, and stable operation is realized. Therefore, the wind turbine 51, can be used while being floated on the sea.

Next, a fourth embodiment of the present invention will be described. Components having the same configurations as those of the third embodiment are denoted by the same reference numerals, and their repeated descriptions are omitted.

Figure 24:
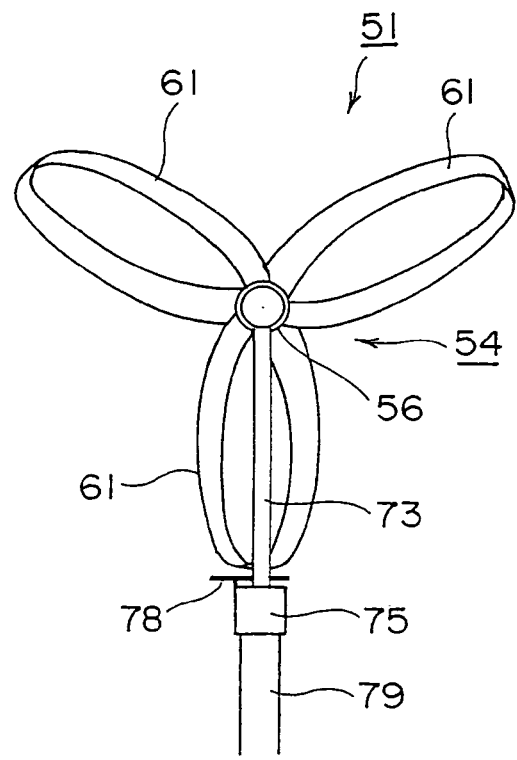
FIG. 24 is a front view of a wind turbine according to a fourth embodiment of the present invention.
Figure 25:
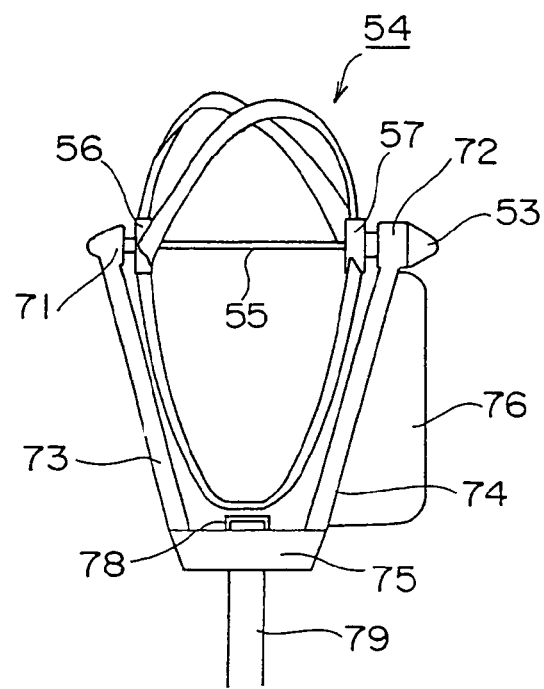
FIG. 25 is a side view of the wind turbine according to the fourth embodiment of the present invention.

FIG. 24 is a front view of a wind turbine according to the fourth embodiment of the present invention; and FIG. 25 is a side view of the wind turbine according to the fourth embodiment of the present invention.

In the present embodiment, a bearing 71 is disposed on the front side of a front hub 56, and a bearing 72 is disposed on the rear side of a rear hub 57. A rotation unit 54 is rotatably supported by the bearings 71 and 72. The bearings 71 and 72 are connected with a nacelle 75 via a front stay 73 and a rear stay 74. A tail wing 76 is attached to the rear stay 74 in such a manner that the tail wing 76 projects rearward (rightward in FIG. 25). The nacelle 75 is rotatably mounted to a support column 79. Notably, a stopper 78 is disposed between the nacelle 75 and the rotation unit 54.

In this case, since the center of the rotation unit 54 is aligned with the center of the support column 79 serving as a support portion, generation of vibration during rotation of the rotation unit 54 can be suppressed, and a turning force generated when the rotation unit 54 turns to the upwind direction can be reduced. Since the turning force is small, under a strong wind or similar conditions, mutual interference between a gyro moment generated upon rotation of the rotation unit 54 and a deflection moment acting on the tail wing 76 can be reduced, and thus, generation of vibration can be suppressed.

Notably, a connecting member in the form of a bar or plate may be disposed near the centers of the respective wings 61 in the radial direction in order to connect the respective wings 61, thereby suppressing deflection of the wings 61.

Next, a fifth embodiment of the present invention will be described.

Figure 26:
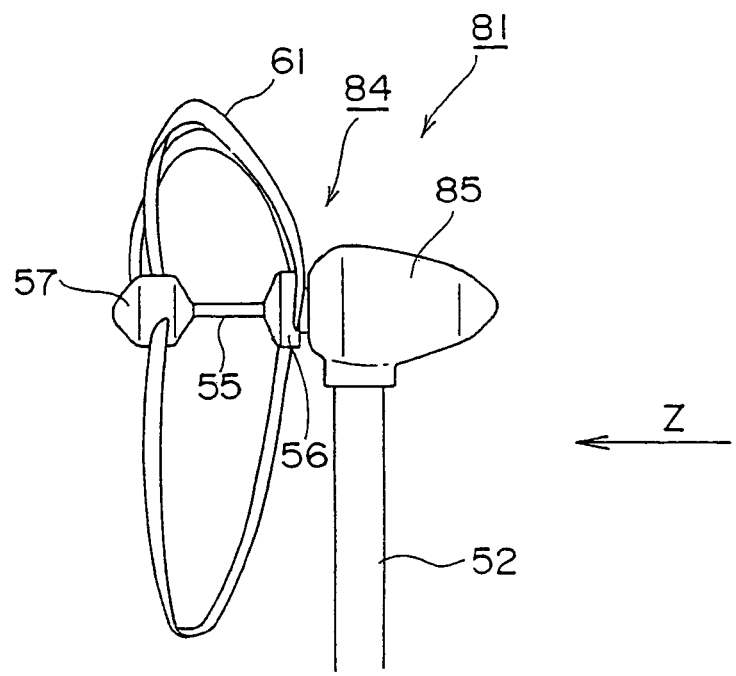
FIG. 26 is a side view of a wind turbine according to a fifth embodiment of the present invention.
Figure 27:
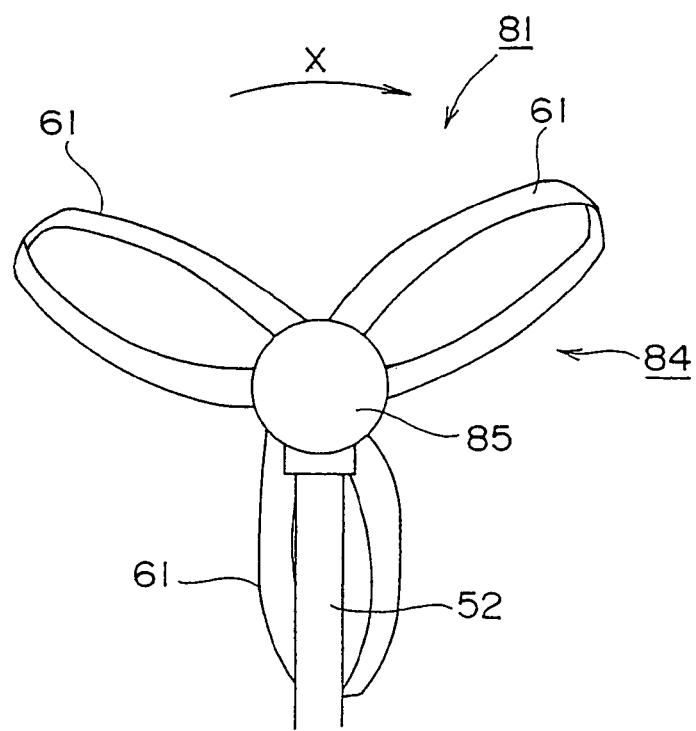
FIG. 27 is a front view of the wind turbine according to the fifth embodiment of the present invention.
Figure 28:
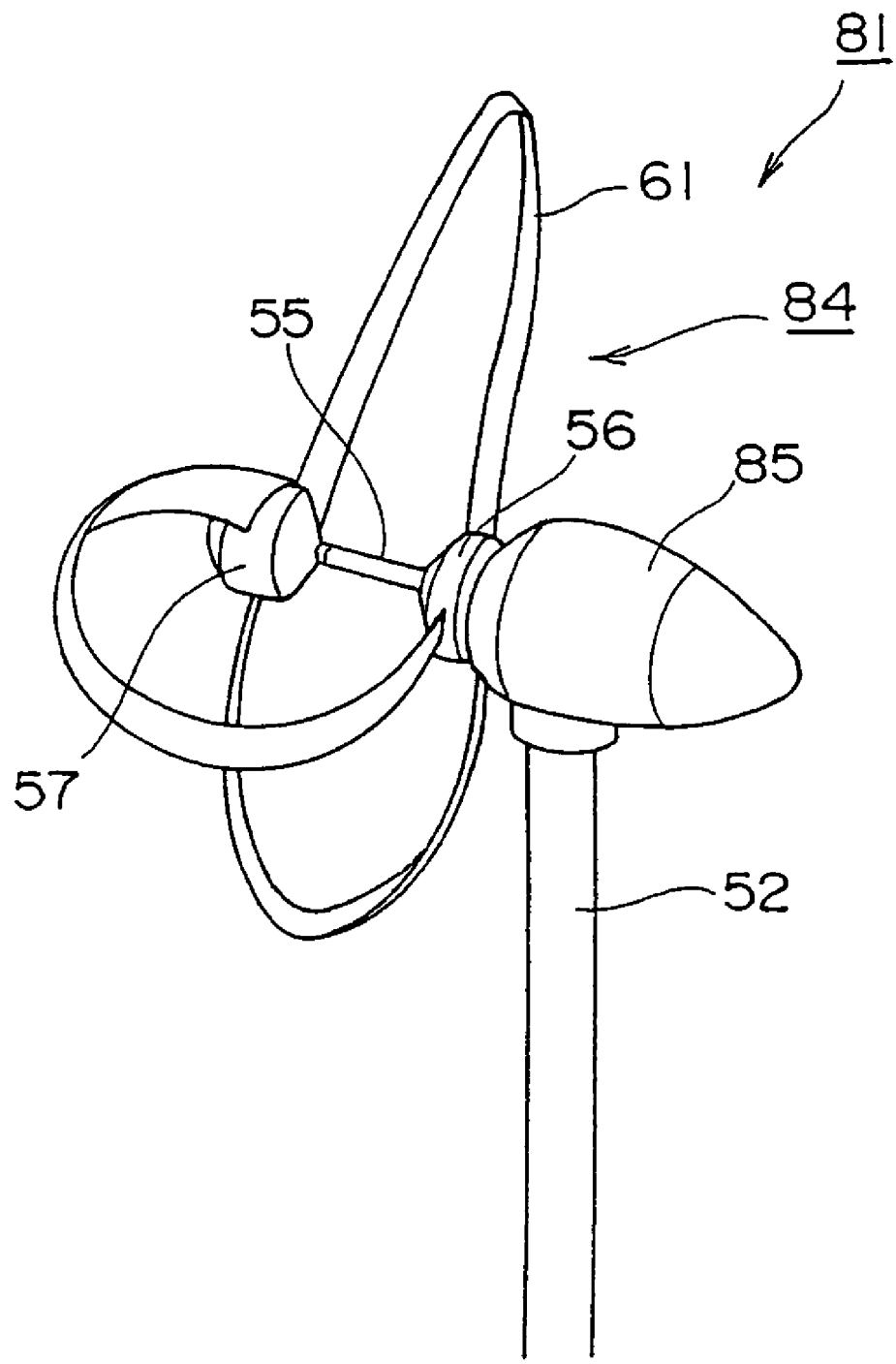
FIG. 28 is a perspective view of the wind turbine according to the fifth embodiment of the present invention.

FIG. 26 is a side view of a wind turbine according to the fifth embodiment of the present invention; FIG. 27 is a front view of the wind turbine according to the fifth embodiment of the present invention; and FIG. 28 is a perspective view of the wind turbine according to the fifth embodiment of the present invention.

In these drawings, reference numeral 81 denotes a downwind-type wind turbine serving as a fluid machine; 85 denotes a generator (serving as an electrical device) rotatably attached to the upper end of a support column 52, which serves as a support portion; and 84 denotes a rotation unit disposed to be rotatable relative to the generator 85. The rotation unit 54 includes a shaft 55 attached to an unillustrated rotor of the generator 85; a front hub 56 fixed to an approximate center of the shaft 55 to be located adjacent to the generator 85; a rear hub 57 fixed to the rear end (the left end in FIG. 26) of the shaft 55; and a plurality of (three in the present embodiment) wings 61 disposed to extend between the front hub 56 and the rear hub 57. Notably, a wing support comprises the shaft 55, the front hub 56, and the rear hub 57.

In this case, air serving as a fluid is caused to enter from the generator 85 side along the direction of arrow Z in order to rotate the rotation unit 84 in the direction of arrow X. Upon receipt of air, the generator 85 turns towards the upwind direction. Therefore, no tail wing is required.

In the above-described embodiments, there have been described fans, wind turbines, etc., which use air as a fluid. However, the present invention can be applied to axial flow pumps which use water as a fluid and are used in water, wings of tug boats, propulsion systems of submarines which generate a reduced level of noise in water; hydro turbines, axial flow turbines, water jet pumps, ultra slow speed turbines disposed in rivers, as well as to steam turbines which are used in steam.

For example, when the present invention is applied to an axial flow pump, pressure loss generated at the tip end of each wing can be reduced, so pressure performance can be improved. In a tug boat, a considerably large load acts on wings when full power motion is requested in a state in which the boat is tied to a bollard (or when the boat is stopped). Therefore, when the invention is applied to the wings of a tug boat, not only pressure loss generated at the tip ends of the wings, but also generation of tip vortex can be suppressed. As a result, generation of cavitation at the tip ends of the wings can be suppressed, and thus, durability of the wings and the duct can be improved.

Furthermore, the present invention can be applied to blades of a transportation apparatus which transports a material having a high viscosity as a fluid, blades of a stirrer device which stirs fluid, and other types of blades.

When the first wing element has a function for moving fluid forward, and the second wing element has a function for moving fluid backward, upon rotation of the rotation unit, fluid flows between the first and second wing elements in zigzag fashion. Therefore, fluid can be caused to flow at very low speed, while being stirred.

In the above-described embodiments, the wings 21 or 61 are formed as a single body from a single material such as resin. However, the wings 21 or 61 may be fabricated in such a manner that an enforcement material, such as piano wire, is embedded along the front edge q1 and the rear edge q2 of each wing 21 or 61, and the portion between the front edge q1 and the rear edge q2 is formed of an expandable material. In this case, there can be fabricated a special fluid machine in which the camber f changes depending on the flow of fluid.

INDUSTRIAL APPLICABILITY

The present invention can be applied to fluid machines which convert mechanical energy to fluid energy, such as fans, axial flow pumps, propellers, cooling fans, and ventilation fans, as well as to fluid machines which convert fluid energy to mechanical energy, such as wind turbines, steam turbines, and hydro turbines.

The invention claimed is:

1. A fluid machine comprising:
   a rotatably supported wing support; and
   a plurality of wings extending outwards from the wing support at a plurality of locations spaced from each other in a circumfential direction of the wing support,
   each wing including a first wing element extending outward from a first attachment position on the wing support and having an airfoil-shaped cross section, a second wing element extending outward from a second attachment position on the wing support and having an airfoil-shaped cross section, and a third wing element connecting radially outer ends of the first and second wing elements with each other and having a substantially zero pitch ratio, the first wing element having a higher pitch ratio than the second wing element at the same radial distance from a rotational axis of the wing support over most of a region extending radially between the attachment positions and the radially outer ends of the first and second wing elements.

2. A fluid machine as claimed in claim 1, wherein the second wing element is located forward of the first wing element in a rotational direction of the wing support.

3. A fluid machine as claimed in claim 1, wherein the third wing element extends at a constant distance from the wing support to form a flat portion having a substantially zero pitch ratio.

4. A fluid machine as claimed in claim 1, wherein the first attachment position and the second attachment position of each wing are spaced from each other in the circumferential direction of the wing support.

5. A fluid machine as claimed in claim 1, wherein the first attachment position and the second attachment position of each wing are spaced from each other in an axial direction of the wing support.

6. A fluid machine as claimed in claim 1, including a drive mechanism drivingly connected to the wing support to rotate the wing support and the wings.

7. A fluid machine as claimed in claim 6, wherein the drive mechanism comprises an electrical device.

8. A fluid machine as claimed in claim 1, including a duct surrounding the wing support and the wings.

9. A fluid machine as claimed in claim 1, including an electrical device connected to the wing support so as to be driven thereby when the wings rotate.

10. A fluid machine as claimed in claim 1 wherein the first wing element has a constant pitch ratio over most of a region between the first attachment point and the third wing element, and the second wing element has a constant pitch ratio which is smaller than the constant pitch ratio of the first wing element over most of a region extending radially between the second attachment point and the third wing element.

11. A fluid machine as claimed in claim 1 wherein each of the first and second wing elements has a pitch ratio which increases as the distance from the rotational axis of the wing support increases, and the first wing element has a higher maximum pitch ratio than the second wing element.

12. A fluid machine as claimed in claim 1 wherein the airfoil-shaped cross sections of the first and second wing elements are cambered, and the first wing element has a higher camber ratio than the second wing element at the same radial distance from the rotational axis of the wing support.

13. A fluid machine as claimed in claim 1 wherein the first and second wing elements are raked in opposite axial directions of the wing support.

14. A fluid machine as claimed in claim 1 wherein a widthwise centerline of the first wing element is skewed on a first side of a reference line coinciding with the rotational axis of the wing support and a widthwise centerline of the second wing element is skewed on a second side of the reference line with respect to the rotational axis of the wing support.

15. A rotation unit for a fluid machine comprising:
a wing support; and
a plurality of wings extending outwards from the wing support at a plurality of locations spaced from each other in a circumfential direction of the wing support,
each wing including a first wing element extending outward front a first attachment position on the wing support and having an airfoil-shaped cross section, a second wing element extending outward from a second attachment position on the wing support and having an airfoil-shaped cross section, and a third wing element connecting radially outer ends of the first and second wing elements with each other and having a substantially zero pitch ratio, the first wing element having a higher pitch ratio than the second wing element at the same radial distance from a rotational axis of the wing support over most of a region extending radially between the attachment positions and the radially outer ends of the first and second wing elements.

16. A wind turbine comprising:
a support portion;
a rotation unit as claimed in claim 15 supported by the support portion for rotation about an axis of the wing support and for rotation with respect to the support portion to enable the rotation unit to turn into a wind; and
a generator connected to the rotation unit so as to be driven thereby when the rotation unit rotates about the axis of the wing support.

17. A method of generating electricity comprising disposing a wind turbine as claimed in claim 16 in flowing air.

* * * * *